United States Patent
Fujita

(10) Patent No.: US 12,345,726 B2
(45) Date of Patent: Jul. 1, 2025

(54) PLATE CHANGER

(71) Applicant: SHIMADZU CORPORATION, Kyoto (JP)

(72) Inventor: Takaaki Fujita, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 961 days.

(21) Appl. No.: 17/437,295

(22) PCT Filed: Mar. 13, 2019

(86) PCT No.: PCT/JP2019/010337
§ 371 (c)(1),
(2) Date: Sep. 8, 2021

(87) PCT Pub. No.: WO2020/183662
PCT Pub. Date: Sep. 17, 2020

(65) Prior Publication Data
US 2022/0170955 A1 Jun. 2, 2022

(51) Int. Cl.
*G01N 35/04* (2006.01)
(52) U.S. Cl.
CPC ..... *G01N 35/04* (2013.01); *G01N 2035/0425* (2013.01)
(58) Field of Classification Search
CPC .............. G01N 35/04; G01N 2035/0425
See application file for complete search history.

(56) References Cited

FOREIGN PATENT DOCUMENTS

JP   2006189362 A   *   7/2006

OTHER PUBLICATIONS

International Search Report for corresponding Application No. PCT/JP2019/010337, mailed May 28, 2019.
Written Opinion for corresponding Application No. PCT/JP2019/010337, mailed May 28, 2019 (English machine translation).
Second Office Action for corresponding Chinese Application No. 201980093795.6 dated Aug. 28, 2024 and its English Machine Translation.
Office Action in corresponding Chinese Patent Application No. 201980093795.6 dated Dec. 29, 2023, with English machine translation.
Notice of Reasons for Refusal for corresponding Japanese Patent Application No. 2021-504719, issued Sep. 13, 2022, with English machine translation.

* cited by examiner

*Primary Examiner* — Jill A Warden
*Assistant Examiner* — Alex Ramirez
(74) *Attorney, Agent, or Firm* — Renner, Otto, Boisselle & Sklar, LLP

(57) ABSTRACT

A plate changer that supplies a plate storing a sample to an autosampler included in an analyzer includes a storage that stores the plate, and a plate transporter that transports the plate by holding the plate, the plate transporter receiving the plate from a first plate changer provided at one side of the plate changer and also transferring the plate received from the first plate changer to a second plate changer or the autosampler provided at another side of the plate changer or transferring the plate stored in the storage to the second plate changer or the autosampler.

7 Claims, 13 Drawing Sheets

F I G. 7
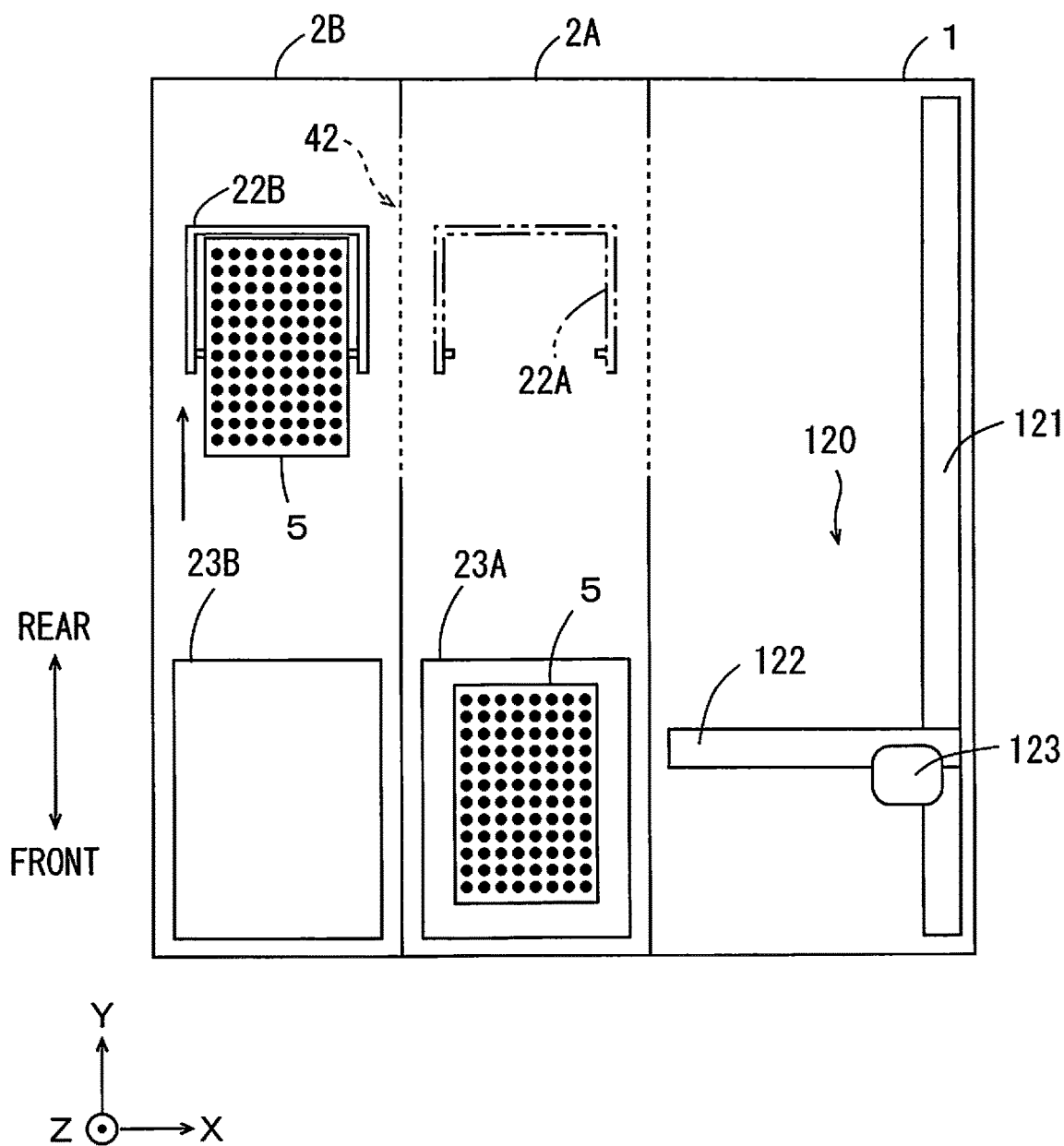

F I G. 1 1
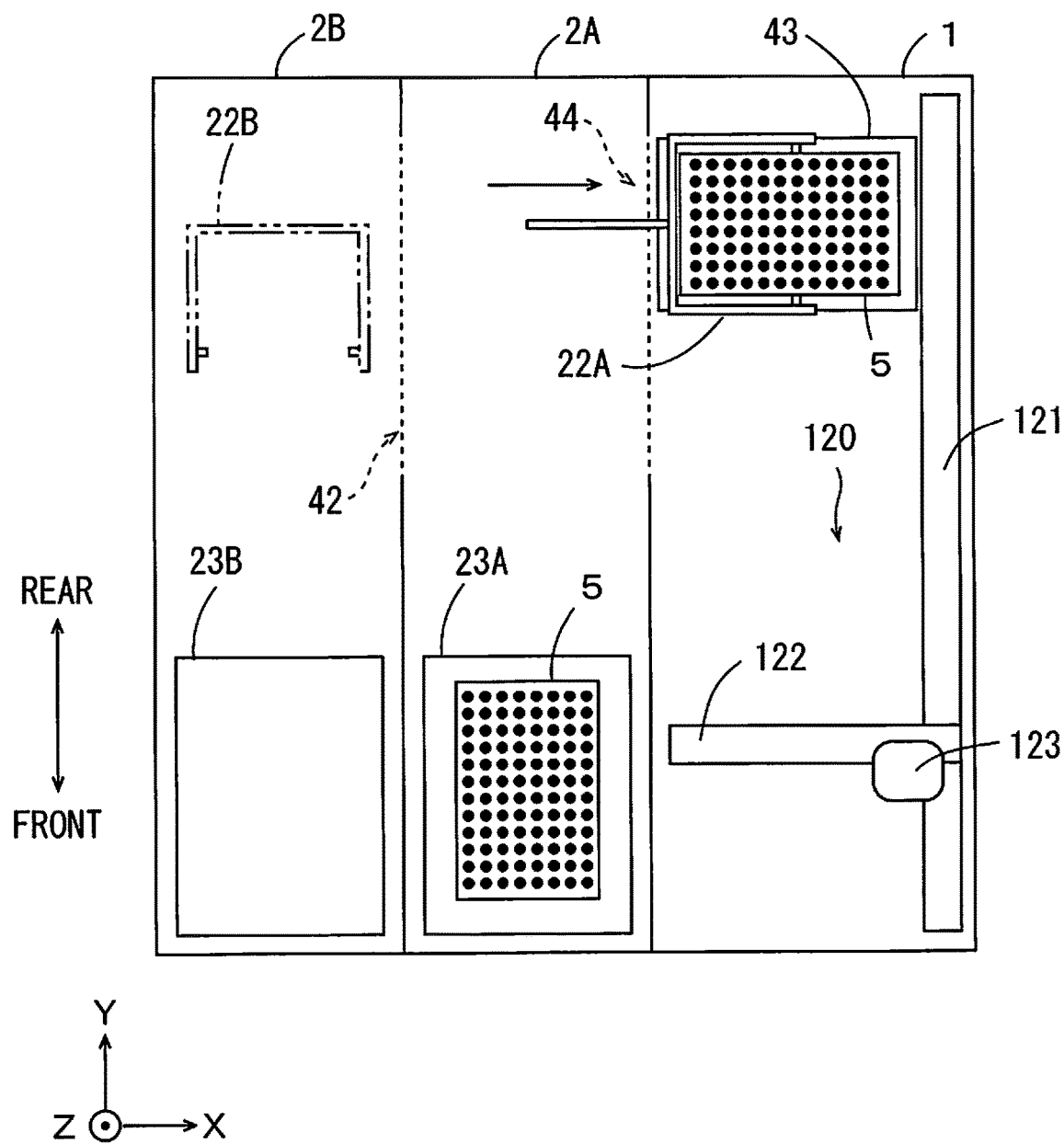

PLATE CHANGER

TECHNICAL FIELD

The present invention relates to a plate changer that supplies plates to an autosampler.

BACKGROUND ART

In an analyzer such as a liquid chromatograph, an autosampler that continuously supplies samples to an analysis flow path is used. The autosampler sucks samples from sample bottles stored in plates or from wells provided in the plates and injects the sucked samples into the analysis flow path.

When a large amount of samples are subjected to analysis processing in the analyzer, a large number of plates are required. It is necessary to increase the size of the autosampler in order to increase the number of plates stored in the autosampler. As the size of the autosampler is increased, a drive range of needle that sucks and injects samples is enlarged and, therefore, the size of a mechanism of a drive system is increased.

As such, conventionally, an apparatus called a plate changer in which many storages for stocking plates are arranged in a top-and-bottom direction has been used. The plate changer includes a plate transporter. The plate transporter takes out the plates stored in the racks and supplies the plates to the autosampler. This makes it possible to utilize the large number of plates for analysis processing without increasing the size of the configuration of the autosampler. Patent Document 1 shown below discloses a container changer. In the container changer of Patent Document 1, a container transporter transports a container to a sample automatic injector and, after sample injection, returns the container to its original storing place.

[Patent Document 1] JP 2006-189362 A

SUMMARY OF INVENTION

Technical Problem

As described above, the plate changer can store the large number of plates in the storages. However, the number of plates required is different depending on each user. Increasing or decreasing the number of the storages for each user leads to an increase in manufacturing cost of the plate changer. Also, when the number of plates required is increased, the user needs to purchase a new plate changer that stores a larger number of plates, which causes an increase in cost.

An object of the present invention is to provide a plate changer capable of flexibly dealing with the number of plates that can be supplied to an autosampler according to a user's needs.

Solution to Problem

A first aspect of the present invention is directed to a plate changer that supplies a plate storing a sample to an autosampler included in an analyzer, the plate changer including: a storage that stores the plate; and a plate transporter that transports the plate by holding the plate, the plate transporter receiving the plate from a first plate changer provided at one side of the plate changer and also transferring the plate received from the first plate changer to a second plate changer or the autosampler provided at another side of the plate changer or transferring the plate stored in the storage to the second plate changer or the autosampler.

Advantageous Effects of Invention

With the plate changer of the present invention, it is possible to flexibly deal with the number of plates that can be supplied to the autosampler according to the user's needs.

BRIEF DESCRIPTION OF THE DRAWINGS

FIG. 7 is a diagram for explaining the operation of the plate changers.
FIG. 11 is a diagram for explaining the operation of the plate changers.

DESCRIPTION OF EMBODIMENTS

(1) Configuration of Autosampler and Plate Changers

Figure 1:
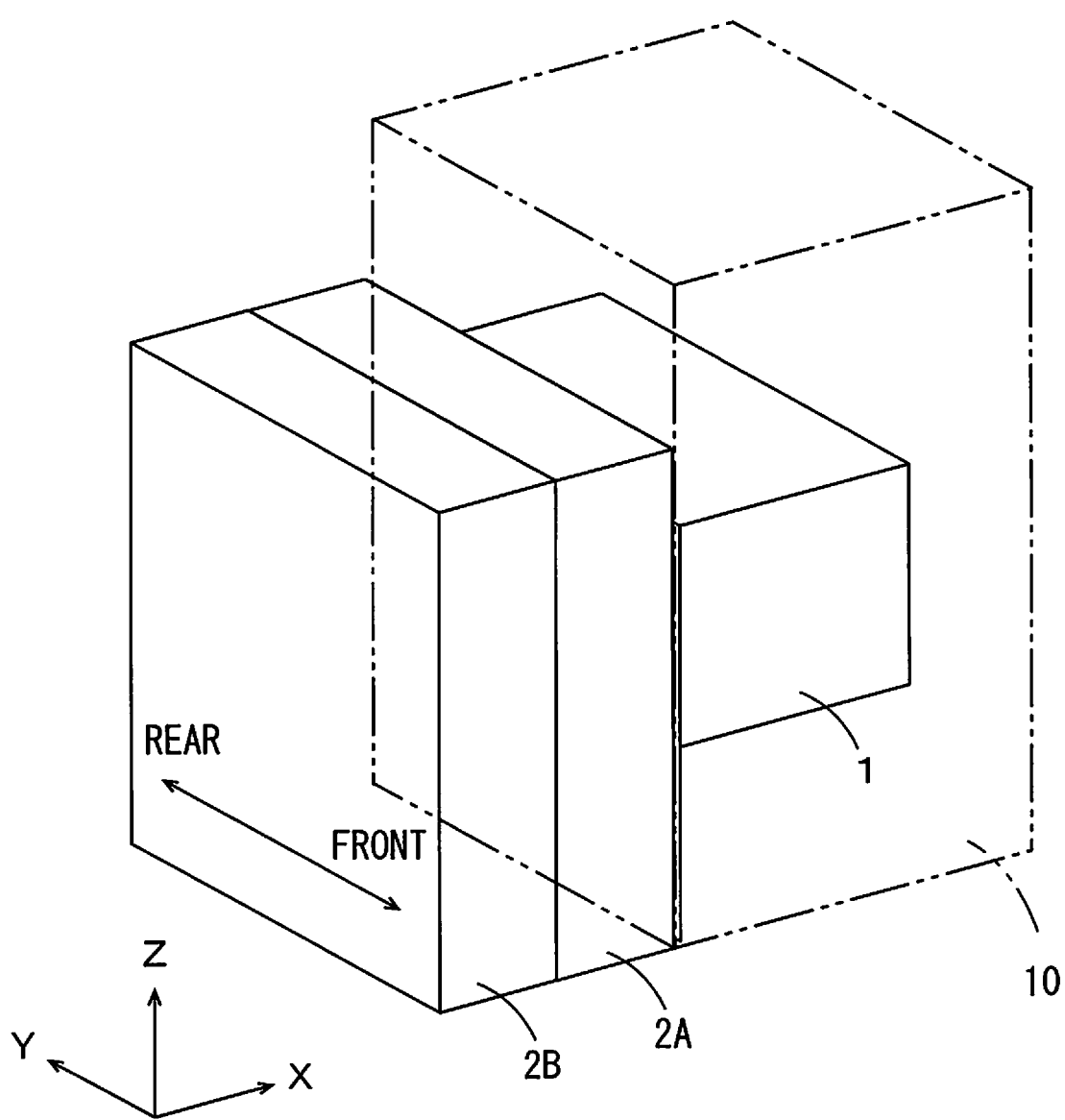
FIG. 1 is a perspective view of an autosampler and plate changers according to an embodiment.

FIG. 1 is a perspective view of an autosampler 1 and plate changers 2A, 2B according to this embodiment. In the following description, an X direction, a Y direction, and a Z direction shown in each of the drawings are referred to as appropriate. In FIGS. 1 to 12, an XY plane corresponds to a horizontal plane, and the Z direction corresponds to a vertical direction. Also, in FIGS. 1 to 12, description is made on a case where the X direction is a left-and-right direction and the Y direction is a front-and-rear direction as an example.

The autosampler 1 is incorporated as a unit in a liquid chromatograph 10 that is an analyzer of this embodiment. The liquid chromatograph 10 also includes other units such as a pump unit, a column oven unit and a detector unit. The autosampler 1 continuously supplies samples to an analysis flow path of the liquid chromatograph 10.

The plate changers 2A, 2B each supply a plate storing the samples to the autosampler 1. The samples are stored in sample bottles arranged in the plate. A large number of sample bottles can be arranged in the plate. Alternatively, the samples are stored in wells formed in the plate. A large number of wells can be formed in the plate. For example, 96 or 384 sample bottles are stored or wells are formed in the plate.

In this embodiment, as shown in FIG. 1, the autosampler 1, the plate changer 2A, and the plate changer 2B are arranged to line up in an X axis direction (the left-and-right direction). That is, the autosampler 1 is arranged at one side (a right side) of the plate changer 2A in the X axis direction, and the plate changer 2B is arranged at another side (a left side) of the plate changer 2A in the X axis direction.

Figure 2:
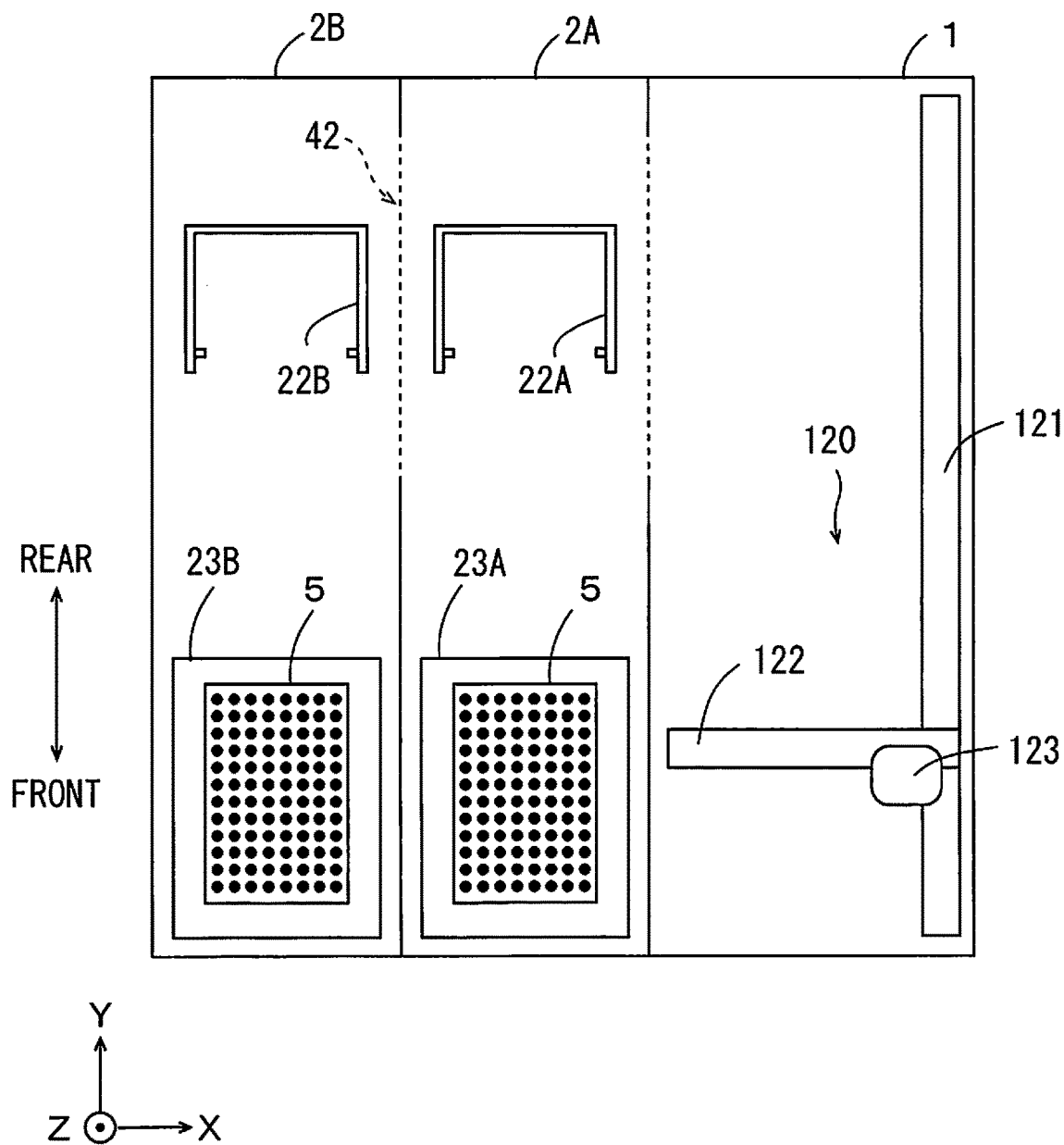
FIG. 2 is a plan view showing an internal structure of the autosampler and the plate changers according to the embodiment.
Figure 3:
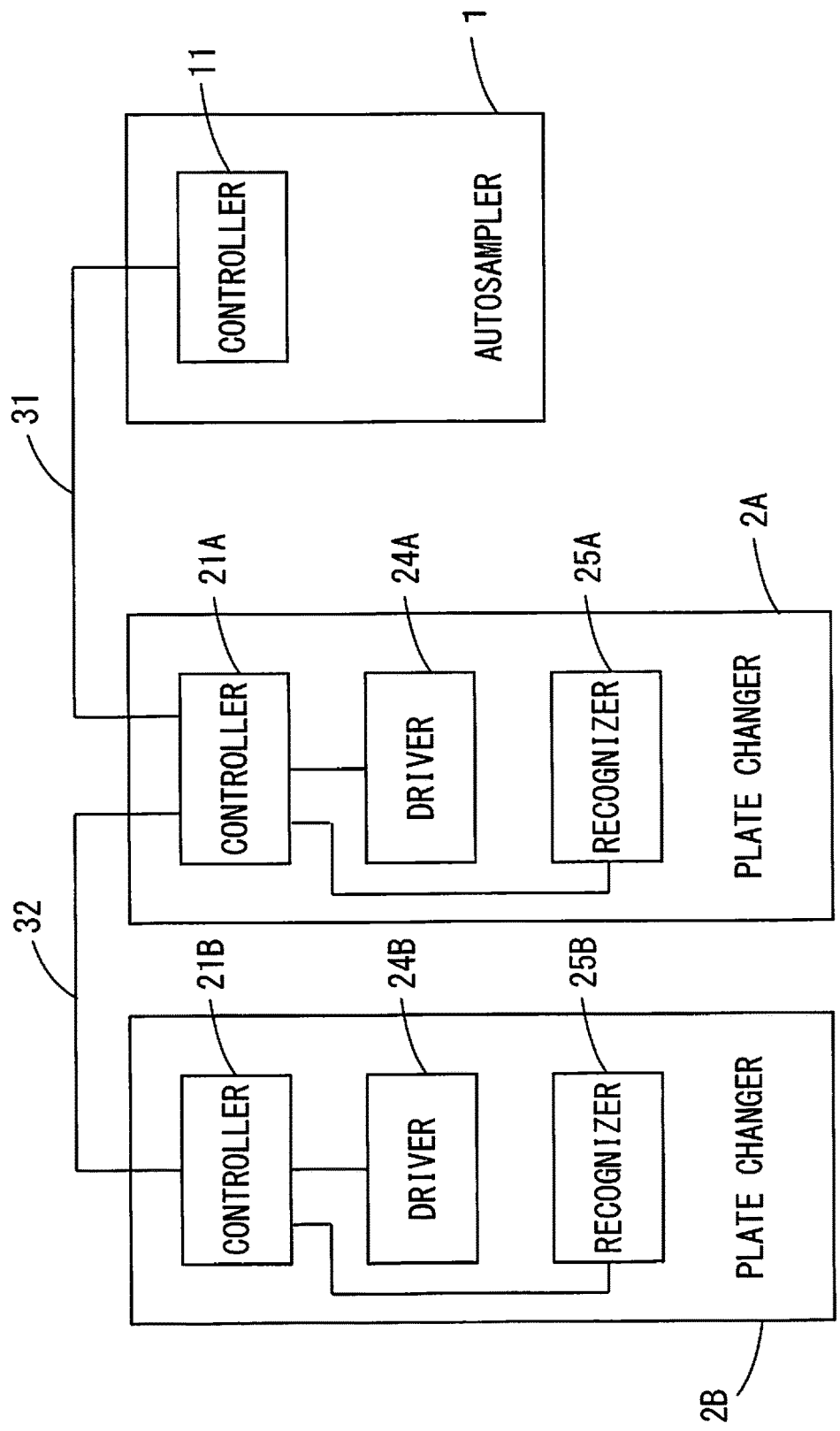
FIG. 3 is a functional block diagram of the autosampler and the plate changers according to the embodiment.

FIG. 2 is a plan view showing an internal structure of the autosampler 1 and the plate changers 2A, 2B according to this embodiment. FIG. 3 is a functional block diagram of the autosampler 1 and the plate changers 2A, 2B according to this embodiment. As shown in FIG. 1, the autosampler 1 and the plate changers 2A, 2B are covered with casings. In FIG. 2, a ceiling surface of each casing is not shown to explain the internal structure of the autosampler 1 and the plate changers 2A, 2B.

As shown in FIG. 2, the autosampler 1 includes a needle driver 120. The needle driver 120 includes a Y axis guide rail 121, an X axis guide rail 122, and a Z axis guide 123. The Z axis guide 123 supports a needle not shown. The needle injects samples into the analysis flow path of the liquid chromatograph 10. As shown in FIG. 3, the autosampler 1 includes a controller 11.

The Y axis guide rail 121 extends in the Y axis direction. The X axis guide rail 122 extends in the X axis direction. The X axis guide rail 122 is movable in the Y axis direction along the Y axis guide rail 121. The Z axis guide 123 is movable in the X axis direction along the X axis guide rail 122. The Z axis guide 123 includes a driver that can advance and retreat in the Z axis direction. With this configuration, the controller 11 of the autosampler 1 moves the X axis guide rail 122 along the Y axis guide rail 121, moves the Z axis guide 123 along the X axis guide rail 122, and advances and retreats the driver of the Z axis guide 123 in the Z axis direction, so that the needle can be moved in three axis directions of the X, Y, and Z axes.

The controller 11 of the autosampler 1 performs control of the autosampler 1. The controller 11 controls the X axis guide rail 122, the Z axis guide 123, and the driver of the Z axis guide to control an operation of the needle. The controller 11 moves the needle to a position of a plate 5 to cause the needle to suck the samples stored in the plate 5. Also, the controller 11 moves the needle to an injection port of an analysis path to inject the samples sucked by the needle into the analysis path.

The controller 11 further includes a communication function. The controller 11 communicates with a system controller of the liquid chromatograph 10. Thus, the controller 11 performs control of the autosampler 1 in accordance with instructions provided by the system controller. Also, the controller 11 performs control of the plate changers 2A, 2B by sending instructions to the plate changers 2A, 2B.

As shown in FIG. 2, the plate changers 2A, 2B include plate transporters 22A, 22B, respectively. The plate changers 2A, 2B also include racks 23A, 23B that store the plates 5, respectively. In the example shown in FIG. 2, the racks 23A, 23B are respectively arranged in front sides of the plate changers 2A, 2B in the Y axis direction. As shown in FIG. 3, the plate changers 2A, 2B include controllers 21A, 21B, drivers 24A, 24B, and recognizers 25A, 25B, respectively.

The plate transporters 22A, 22B are devices that each holds and transports the plate 5. The plate transporters 22A, 22B each hold the plate 5 by pinching the plate 5 with an arm. The plate changers 2A, 2B include the drivers 24A, 24B, respectively. With the drivers 24A, 24B driven, the plate transporters 22A, 22B each perform an advancing and retreating operation in the Y axis direction, a lifting and lowering operation in the Z axis direction, and a rotating operation in the XY plane. Also, with the drivers 24A, 24B driven, the plate transporters 22A, 22B each perform an operation of holding the plate 5 and an operation of releasing the plate 5 with the arm.

Figure 4:
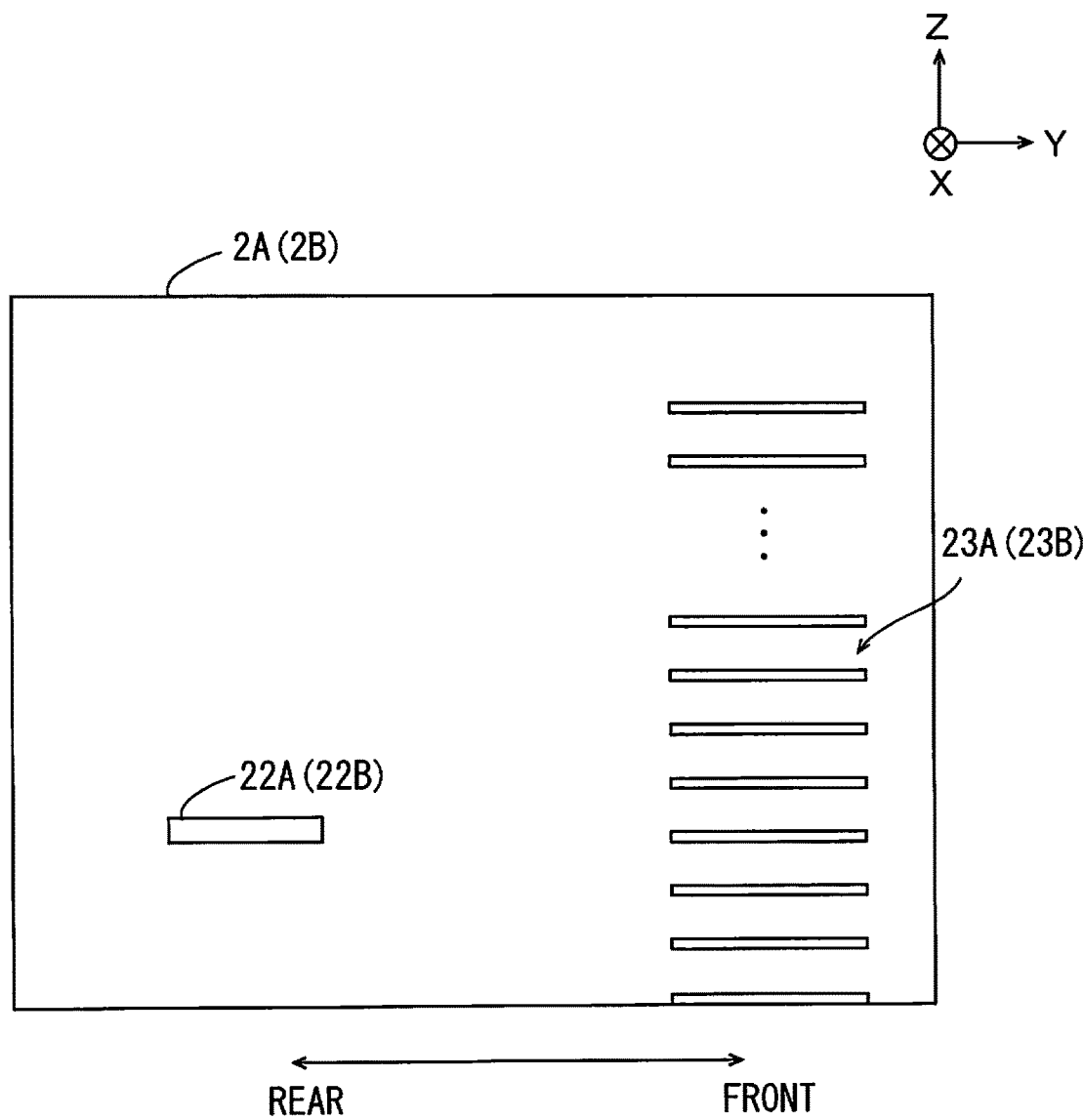
FIG. 4 is a side view showing the internal structure of the plate changer.

FIG. 4 is a side view showing the internal structure of the plate changer 2A (2B). As shown in FIG. 4, the rack 23A, 23B includes a plurality of tiers of slots arranged in the Z axis direction (top-and-bottom direction), and each slot can store the plate 5. For example, the rack 23A, 23B includes 14 tiers of slots in the Z axis direction (top-and-bottom direction) and can store 14 plates 5.

The controllers 21A, 21B perform control of the plate changers 2A, 2B, respectively. The controllers 21A, 21B perform control of the drivers 24A, 24B and the recognizers 25A, 25B, respectively. The controllers 21A, 21B control the drivers 24A, 24B, so that the plate transporters 22A, 22B perform the advancing and retreating operation in the Y axis direction, the lifting and lowering operation in the Z axis direction, the rotating operation in the XY plane, and the operation of holding the plates 5.

The recognizers 25A, 25B recognize the plates 5 stored in the racks 23A, 23B, respectively. An identifier that specifies a type of the plate 5 and contents of a sample stored in the plate 5 is displayed on the plate 5. The recognizer 25A, 25B reads the identifier displayed on the plate 5 to acquire information as to the type of the plate 5 and the sample stored in the plate 5. Examples of the types of the plate 5 include a microtiter plate with 96 wells, a microtiter plate with 384 wells, etc. The identifier is, for example, a color, a character, etc. A barcode may be utilized as the identifier. The recognizer 25A, 25B may be provided in the vicinity of each slot of the rack 23A, 23B. For example, when the rack 23A, 23B includes 14 tiers of slots, the recognizer 25A, 25B is provided at each slot. Alternatively, the recognizer 25A, 25B is provided at one place. In this case, the plate transporter 22A, 22B takes out the plate 5 from the rack 23A, 23B and transports the plate 5 to a position where the recognizer 25A, 25B can read the plate 5.

The controller 21A, 21B includes a communication function. As shown in FIG. 3, the controller 11 of the autosampler 1 and the controller 21A of the plate changer 2A are connected by a communication line 31. The controller 21A of the plate changer 2A and the controller 21B of the plate changer 2B are connected by a communication line 32. In this way, the autosampler 1, the plate changer 2A, and the plate changer 2B are daisy-chain-connected by the communication lines 31, 32.

(2) Operation of Liquid Chromatograph

Description will now be made on an operation of the liquid chromatograph 10 using the autosampler 1 and the plate changers 2A, 2B of this embodiment.

(2-1) Recognition of Plates

First, an operator prepares a plurality of plates 5 storing samples. As described above, the identifier that specifies the type of each plate 5 or the contents of the sample stored in each plate 5 is displayed on each plate 5. The operator stores the prepared plates 5 in the racks 23A, 23B of the plate changers 2A, 2B. A plurality of insertion openings corresponding to the plurality of tiers of slots of the racks 23A, 23B are provided in the casings of the plate changers 2A, 2B. The operator inserts the prepared plurality of plates 5 from the plurality of insertion openings and stores each of the inserted plates 5 in each slot of the racks 23A, 23B. The operator may store each plate 5 in any slot of the racks 23A, 23B.

Then, the recognizers 25A, 25B of the plate changers 2A, 2B recognize the plates 5 stored in the racks 23A, 23B. The recognizers 25A, 25B supply recognition information of the plates 5 to the controllers 21A, 21B, respectively. The controllers 21A, 21B inform the controller 11 of the autosampler 1 of the recognition information via the communication lines 32, 31. By the foregoing operation, the controller 11 of the autosampler 1 and the controllers 21A, 21B of the plate changers 2A, 2B acquire the recognition information of the plates 5.

(2-2) Supply of Plates to Autosampler

An operation of supplying the plates 5 to the autosampler 1 will now be described. First, the controller 11 of the autosampler 1 receives an instruction to designate a target plate 5 to be analyzed from the system controller of the liquid chromatograph 10. Then, the controller 11 transmits an instruction to supply the plate 5 to the plate changer 2A, 2B storing the target plate 5 to be analyzed.

Here, a case in which the target plate 5 is stored in the rack 23B of the plate changer 2B will be described as an example. The controller 11 of the autosampler 1 transmits an instruction to supply the plate 5, a destination of which is the plate changer 2B. The supply instruction is received at the controller 21A of the plate changer 2A via the communication line 31 and received at the controller 21B of the plate changer 2B via the communication lines 31, 32. The controller 21A confirms that the destination of the supply instruction is not the plate changer 2A of itself. The controller 21B confirms that the destination of the supply instruction is the plate changer 2B of itself. The supply instruction transmitted from the controller 11 includes information that specifies the target plate 5. The controller 21B specifies a slot of the rack 23B in which the target plate 5 is stored.

Figure 5:
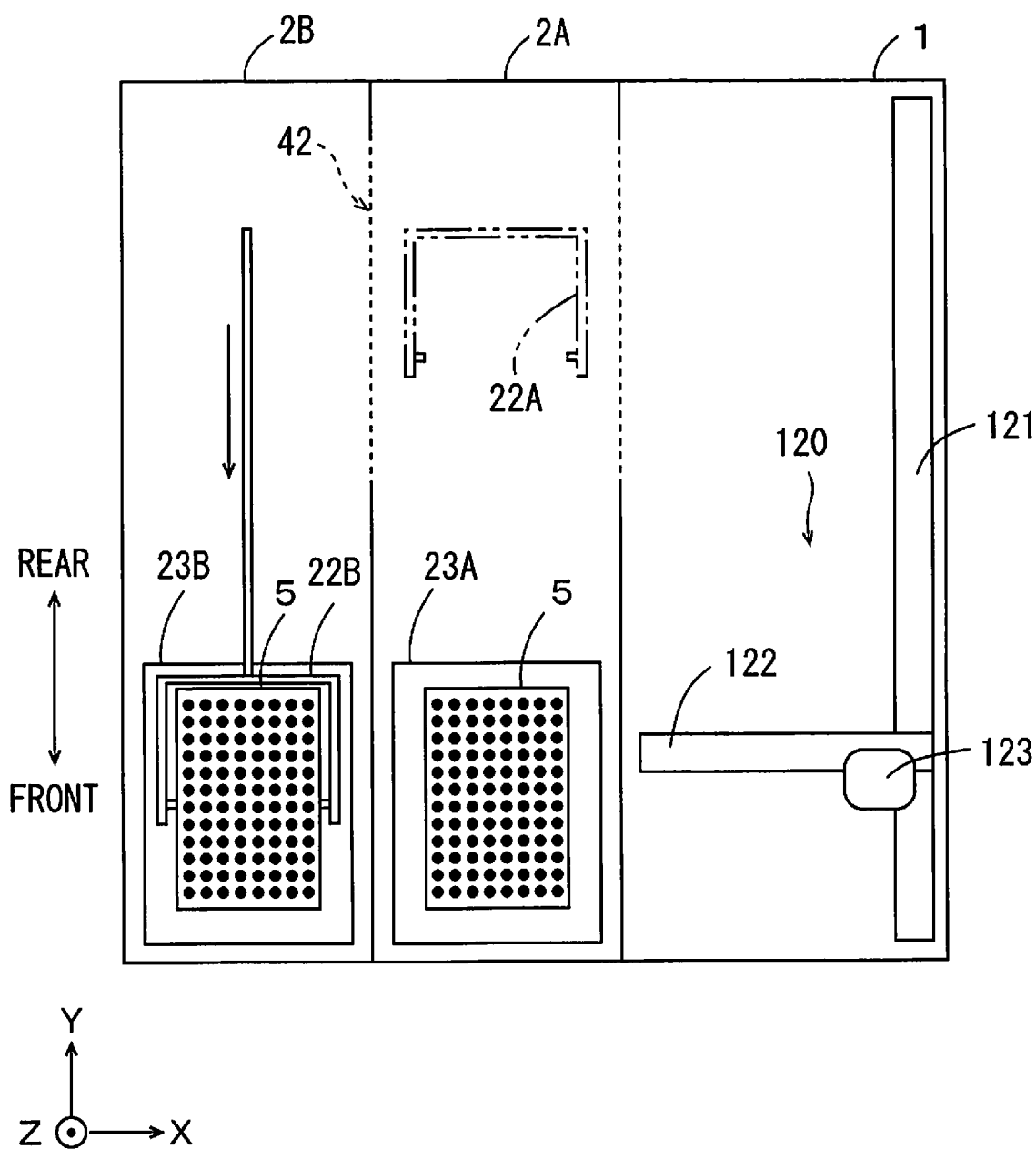
FIG. 5 is a diagram for explaining an operation of the plate changers.

The controller 21B supplies an instruction to transport the target plate 5 to the driver 24B. The driver 24B drives the plate transporter 22B to move to the slot storing the target plate 5. FIG. 5 is a diagram for explaining the operation of the plate changers 2A, 2B and showing a state where the plate transporter 22B moves to the slot of the rack 23B storing the target plate 5. The plate transporter 22B first moves to a level of the slot storing the target plate 5 in the Z axis direction. The plate transporter 22B then moves forward in the Y axis direction and moves to a position where the plate transporter 22B pinches the target plate 5 with the arm, as shown in FIG. 5. Subsequently, the plate transporter 22B performs an operation of closing the arm to hold the target plate 5. For example, in a case where the target plate 5 is stored in a slot on the tenth tier from the bottom, the plate transporter 22B first moves in the top-and-bottom direction (Z axis direction) to a position of the slot on the tenth tier. Subsequently, the plate transporter 22B moves forward in the Y axis direction to hold the plate 5.

In FIG. 5, the controller 11 of the autosampler 1 provides a retracting instruction to the plate transporter 22A before the plate transporter 22B starts the operation of holding the target plate 5 or while the plate transporter 22B performs the holding operation. The retracting instruction is an instruction to retract the plate transporter 22A to a level at which the plate transporter 22A does not interfere with a transfer operation so as to prevent the plate transporter 22A from interfering with the plate transporter 22B and the plate 5 held by the plate transporter 22B.

Figure 6:
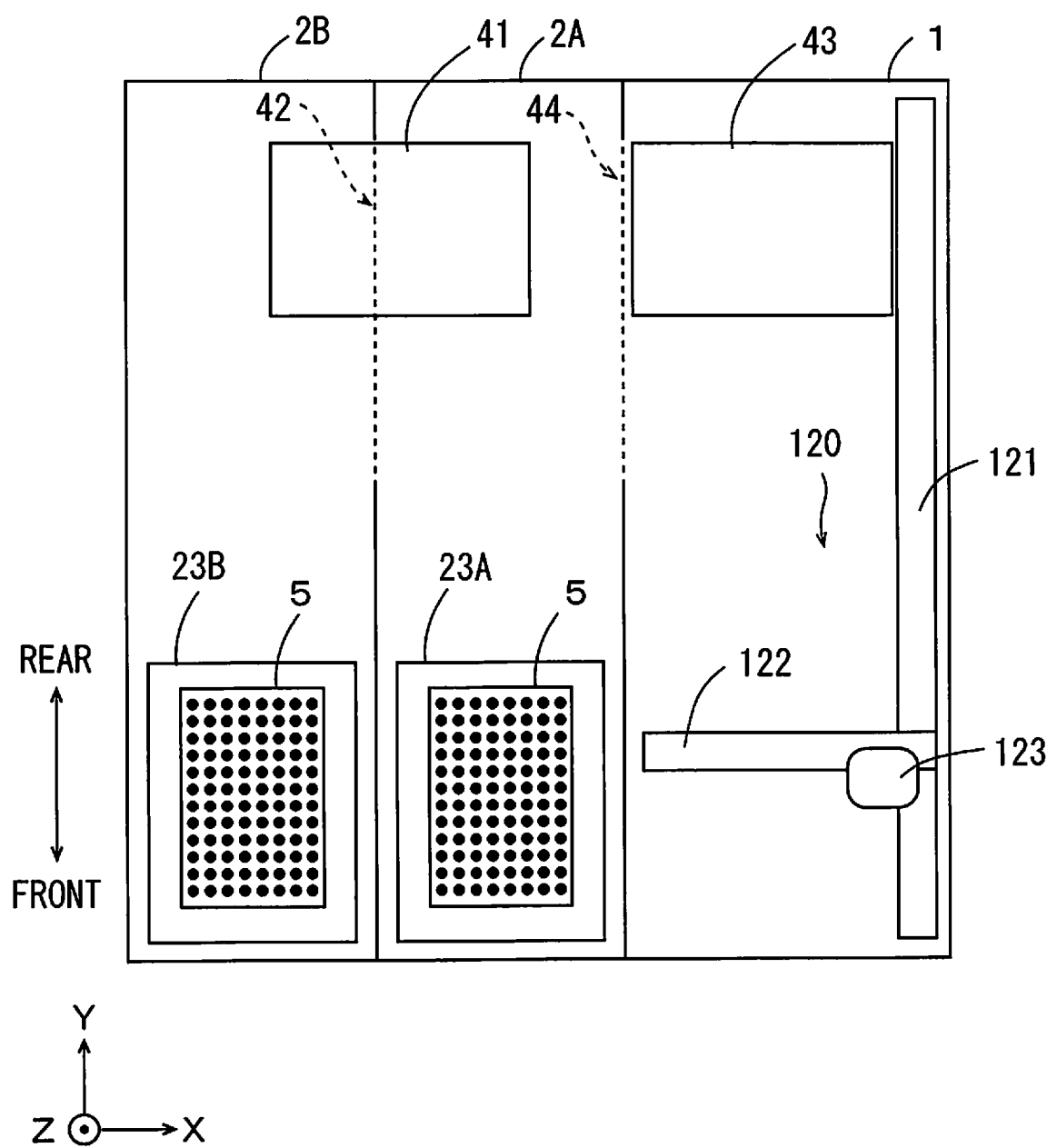
FIG. 6 is a diagram showing a transfer stage and an analysis plate stage.

In this embodiment, it is positions of bottom plates in the casings of the plate changers 2A, 2B that the plate transporter 22B performs the operation of transferring the plate 5 to the plate changer 2A. As shown in FIG. 6, a transfer stage 41 is provided at the positions of the bottom plates in the casings of the plate changers 2A, 2B in a manner that the transfer stage 41 bridges across the bottom plates of the both casings. In the casings of the plate changers 2A, 2B, a transfer window 42 is formed at the place where the transfer stage 41 is arranged. That is, the plate changers 2A, 2B are connected at the transfer window 42. Thus, when the plate transporter 22A is at a position corresponding to a slot on the lowest tier of the rack 23A, the plate transporter 22A moves upward (in the Z axis direction) and retracts so as not to interfere with the transfer operation by the plate transporter 22B. For example, the plate transporter 22A rises to a position between the slot on the lowest tier and a slot on the second tier from the bottom. The position at this level is a retracting position. In FIG. 5, the plate transporter 22A is denoted with a two-dot and dash line, which indicates that the plate transporter 22A is at the retracting position.

Then, the controller 21B drives the driver 24B to move the plate transporter 22B backward in the Y axis direction. Thus, the plate transporter 22B moves away from the rack 23B while holding the plate 5, and returns to a rear position in the plate changer 2B as shown in FIG. 7. Subsequently, the controller 21B controls the driver 24B to lower the plate transporter 22B to the position where the transfer stage 41 is located. FIG. 7 is a diagram for explaining the operation of the plate changers 2A, 2B and showing a state where the plate transporter 22B is lowered to the position where the transfer stage 41 is located at the rear position. For example, in a case where the plate 5 taken out by the plate transporter 22B is stored in the slot on the tenth tier from the bottom, the plate transporter 22B holds the plate 5 at the position of the tenth tier from the bottom and then returns to the rear position, and is subsequently lowered from the tenth tier to the position where the transfer stage 41 is located. In FIG. 7, the plate transporter 22A waits at the level of the retracting position.

Figure 8:
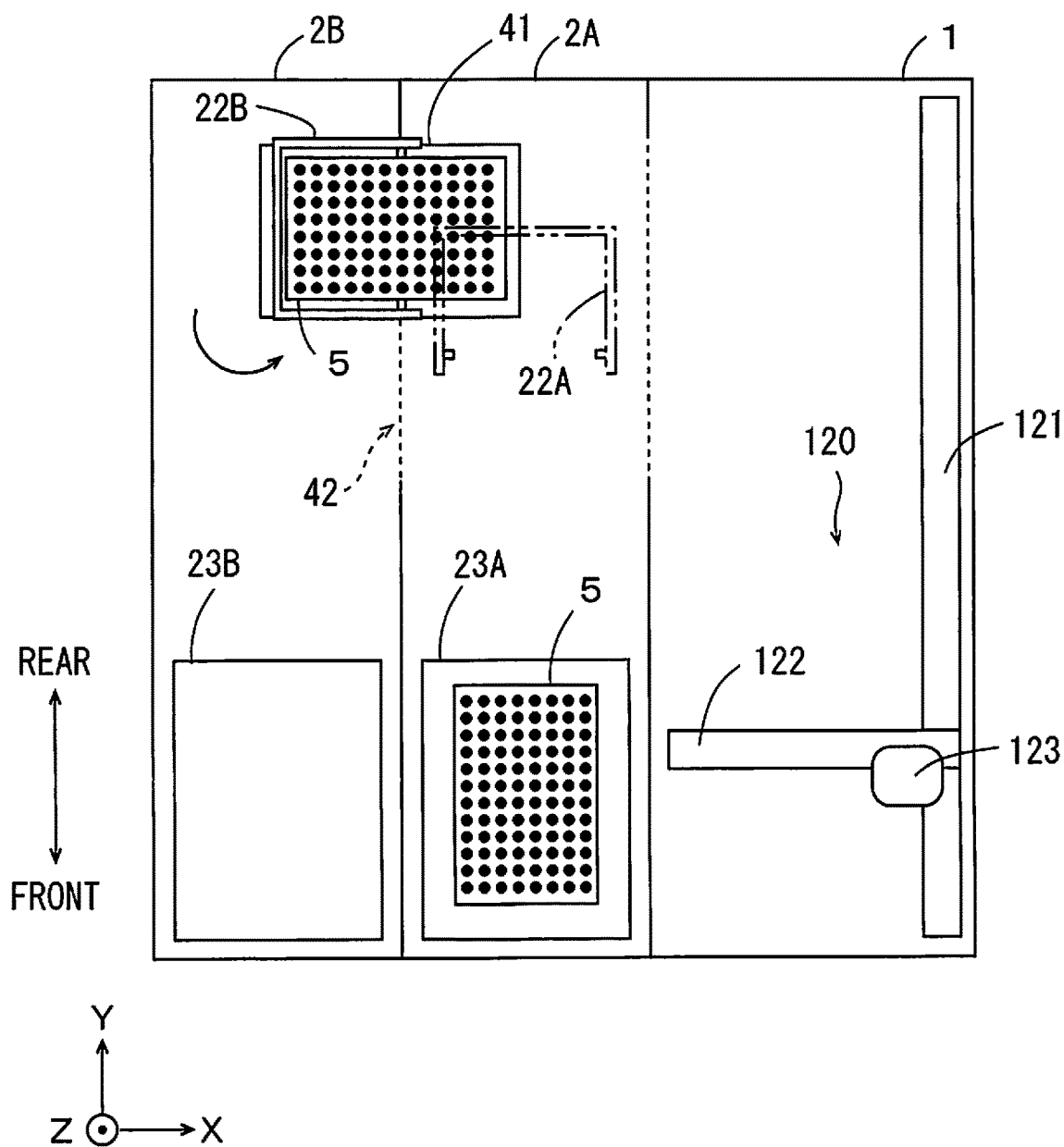
FIG. 8 is a diagram for explaining the operation of the plate changers.

Then, the controller 21B controls the driver 24B to rotate the plate transporter 22B in the XY plane. FIG. 8 is a diagram for explaining the operation of the plate changers 2A, 2B and showing a state where the plate changer 2B is rotated counterclockwise by 90 degree at the position where the transfer stage 41 is located. Then, the controller 21B controls the driver 24B to widen a spacing of the arm of the plate transporter 22B to release the plate 5. Thus, the plate 5 is placed on the transfer stage 41.

Then, the controller 21B controls the driver 24B to raise the plate transporter 22B by a predetermined height and then rotate the plate transporter 22B clockwise by 90 degree. Thus, the plate transporter 22B returns into the plate changer 2B without interfering with the plate 5 with the level of the plate transporter 22B deviated from that of the plate 5. Further, the controller 21B controls the driver 24B to raise the plate transporter 22B to the level of the retracting position.

Figure 9:
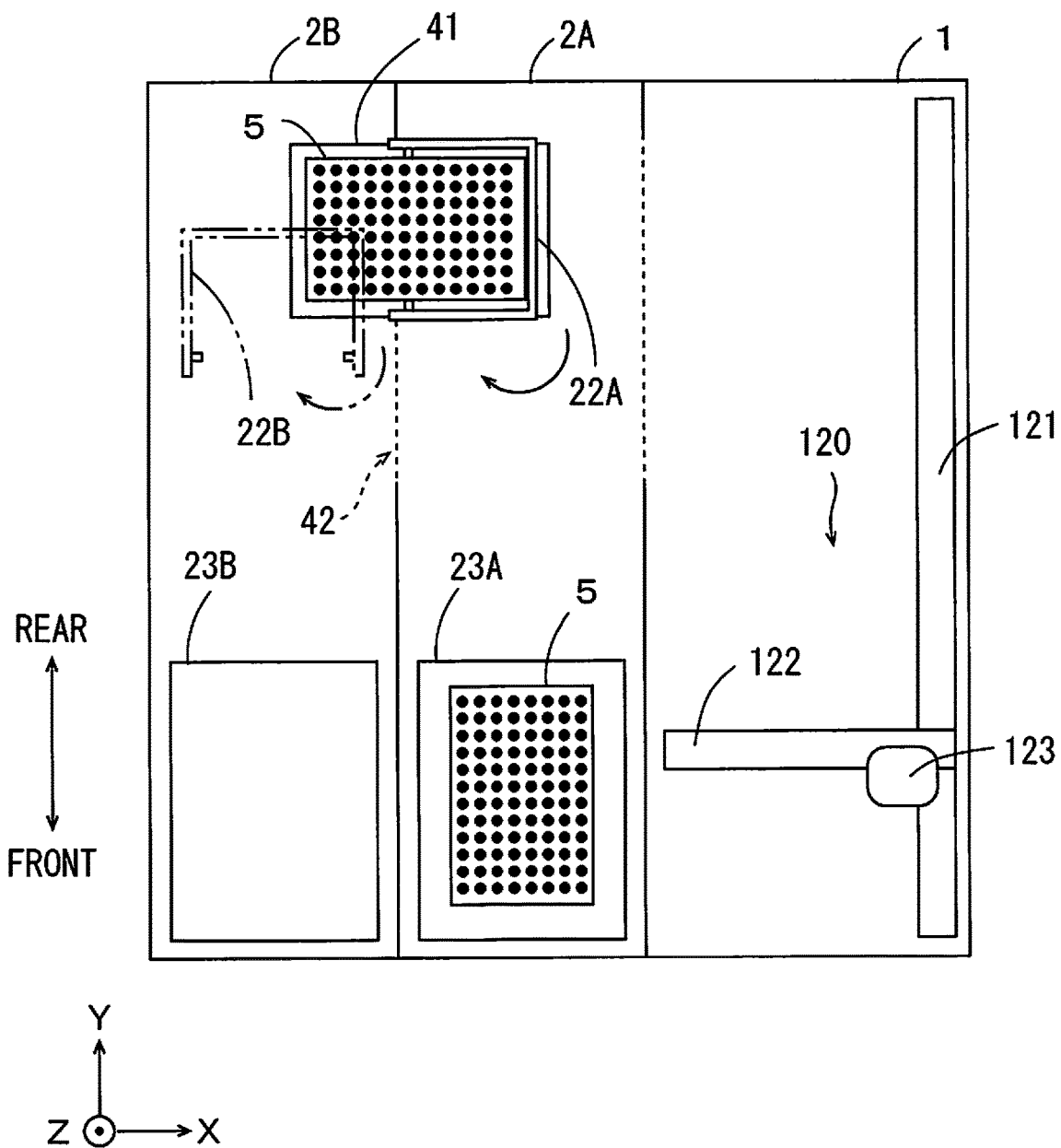
FIG. 9 is a diagram for explaining the operation of the plate changers.

Then, the controller 11 of the autosampler 1 sends an instruction to receive the plate 5 to the controller 21A of the plate changer 2A. In response to this instruction, the controller 21A first controls the driver 24A to lower the plate transporter 22A to the position deviated from the level of the plate 5. Subsequently, the controller 21A rotates the plate transporter 22A clockwise by 90 degree. Then, the controller 21A controls the driver 24A to lower the plate transporter 22A to the position of the transfer stage 41. The controller 21A subsequently controls the driver 24A to narrow the spacing of the arm of the plate transporter 22A to make the plate transporter 22A hold the plate 5. FIG. 9 is a diagram for explaining the operation of the plate changers 2A, 2B and showing a state where the plate transporter 22A holds the plate 5 at the position of the transfer stage 41. In FIG. 9, the plate transporter 22B is denoted with a two-dot and dash line, which indicates that the plate transporter 22B is at the level of the retracting position.

Figure 10:
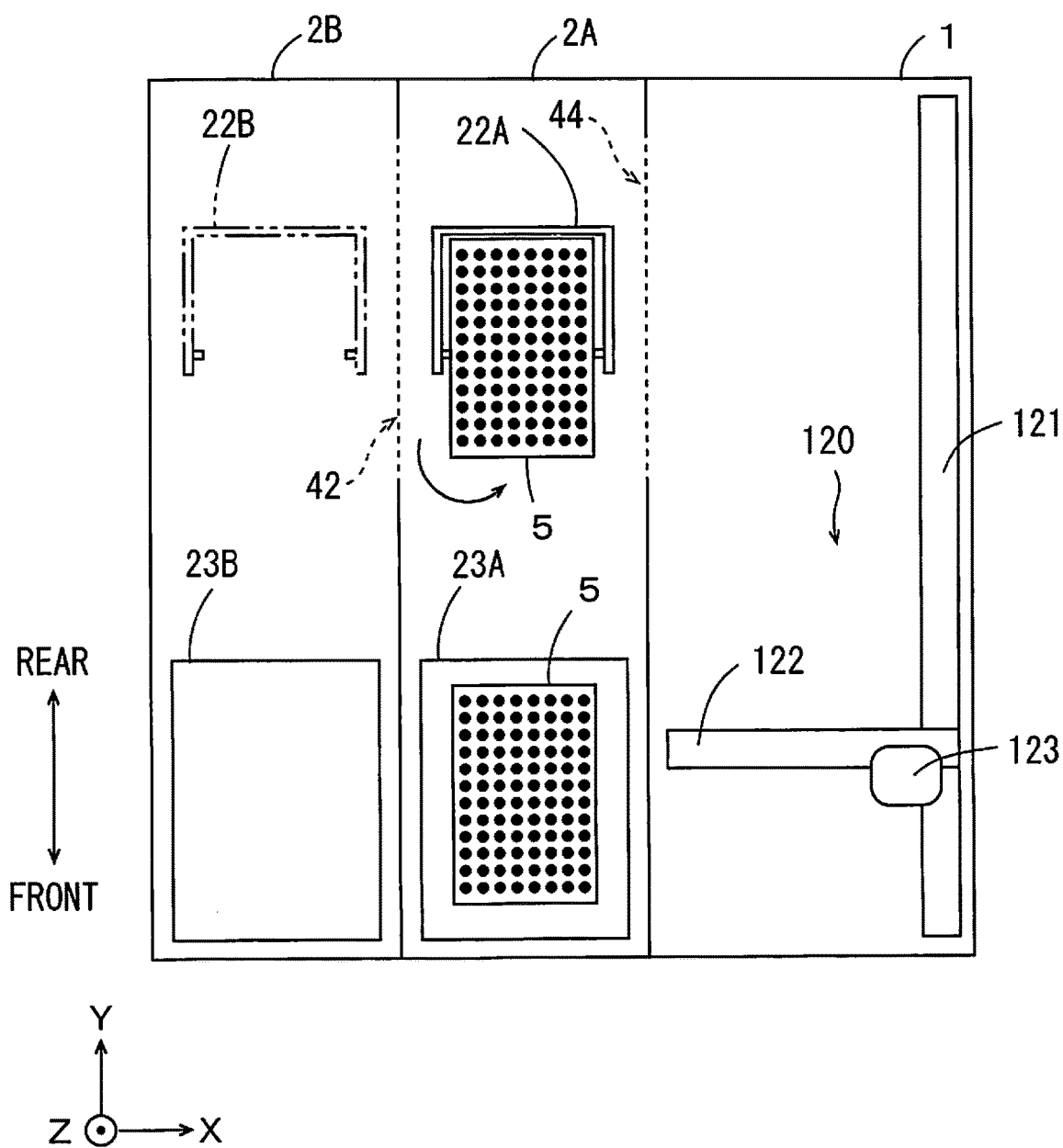
FIG. 10 is a diagram for explaining the operation of the plate changers.

Then, the controller 21A controls the driver 24A to rotate the plate transporter 22A counterclockwise by 90 degree. Thus, the plate transporter 22A returns into the plate changer 2A while holding the plate 5. FIG. 10 is a diagram for explaining the operation of the plate changers 2A, 2B and showing a state where the plate transporter 22A returns into the plate changer 2A while holding the plate 5.

Subsequently, the controller 21A controls the driver 24A to raise the plate transporter 22A to a level of an analysis plate stage 43 in the autosampler 1. In this embodiment, the analysis plate stage 43 shown in FIG. 6 is at a level of a slot on the fifth tier from the bottom in the plate changer 2A. Thus, the plate transporter 22A rises to the level of the slot on the fifth tier from the bottom. A window 44 is provided on side surfaces of the casings of the plate changer 2A and the autosampler 1. The plate changer 2A and the autosampler 1 are connected at the window 44.

Then, the controller 21A controls the driver 24A to rotate the plate transporter 22A counterclockwise by 90 degree. Further, the controller 21A controls the driver 24A to move the plate transporter 22A in a right direction (a direction toward the autosampler 1 in the X axis direction). FIG. 11 is a diagram for explaining the operation of the plate changers 2A, 2B and showing a state where the plate transporter 22A moves into the autosampler 1 while holding the plate 5. As described above, the driver 24A of the plate transporter 22A includes a driver that can advance and retreat in the Y axis direction. In the operation shown in FIG. 11, since the plate transporter 22A is rotated by 90 degree, the plate transporter 22A can advance and retreat in the X axis direction by driving of the driver 24.

Figure 12:
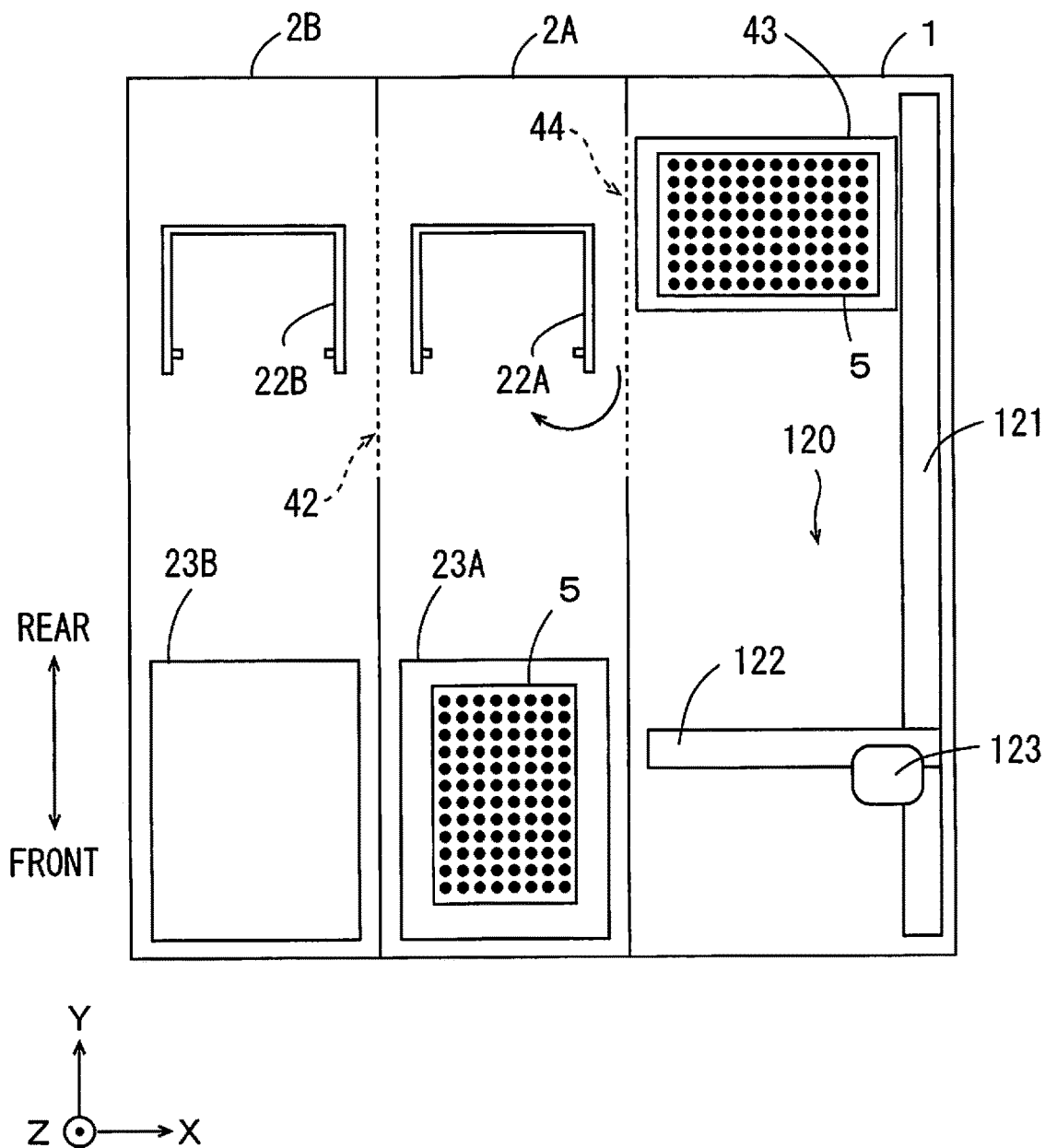
FIG. 12 is a diagram for explaining the operation of the plate changers.

Subsequently, the controller 21A controls the driver 24A to widen the spacing of the arm of the plate transporter 22A to make the plate transporter 22A release the plate 5. Thus, the plate 5 is placed on the analysis plate stage 43. Then, the controller 21A controls the driver 24A to raise the plate transporter 22A by a predetermined height so as not to interfere with the plate 5, and then move the plate transporter 22A in a left direction (a direction farther away from the autosampler 1 in the X axis direction). Further, the controller 21A controls the driver 24A to rotate the plate transporter 22A clockwise by 90 degree. Thus, the plate transporter 22A returns into the plate changer 2A with the level of the plate transporter 22A deviated from that of the plate 5. Finally, the controller 11 of the autosampler 1 instructs the controller 21A of the plate changer 2A and the controller 21B of the plate changer 2B to move to a standby position. The controllers 21A and 21B control the drivers 24A and 24B to lower and move the plate transporters 22A, 22B to the standby positions, respectively. FIG. 12 is a diagram for explaining the operation of the plate changers 2A, 2B and showing a state where the plate 5 is placed on the analysis plate stage 43 and the plate transporters 22A, 22B are positioned at the standby positions.

By the foregoing operations, the plate 5 stored in the rack 23B of the plate changer 2B is transported to the analysis plate stage 43 of the autosampler 1 via the plate changer 2A. The controller 11 of the autosampler 1 moves the needle to suck the sample from the plate 5 placed on the analysis plate stage 43 and inject the sucked sample into the analysis path.

As has been described above, the plate changers 2A, 2B of this embodiment can supply the plate 5 to the autosampler 1 by transferring the plate 5 between the plate changers 2A and 2B. Thus, it is possible to flexibly deal with the number of plates 5 that can be supplied to the autosampler 1 according to the user's needs by increasing or decreasing the number of the plate changers to be connected. Since a combination of the plate changers having the common structure can be utilized, a manufacturing cost for such plate changers can be reduced compared to a cost required to individually manufacture the plate changers according to the number of plates.

(2-3) Collection of Plates from Autosampler

When analysis processing on the plate 5 transported to the analysis plate stage 43 is completed, the plate 5 is returned to the rack 23B of the plate changer 2B. This operation is opposite to the operation of "(2-2) Supply of Plates to Autosampler" as described above.

First, the plate transporter 22A rotates counterclockwise by 90 degree at the level of the analysis plate stage 43 in the autosampler 1 and moves into the autosampler 1. Then, the plate transporter 22A is lowered to a predetermined level and holds the plate 5 placed on the analysis plate stage 43. Subsequently, the plate transporter 22A rises to the level of the analysis plate stage 43 in the autosampler 1 again, and then rotates clockwise by 90 degree and returns into the plate changer 2A.

Subsequently, the plate transporter 22A is lowered from the level of the analysis plate stage 43 in the autosampler 1 to the position of the transfer stage 41. Then, the plate transporter 22A rotates clockwise by 90 degree and transports the plate 5 to the position of the transfer stage 41. At this time, the plate transporter 22B waits at the retracting position. Then, the plate transporter 22A opens the arm to release the plate 5. The plate transporter 22A then rises by a predetermined height and rotates counterclockwise by 90 degree while avoiding the interference with the plate 5. Thus, the plate 5 is placed on the transfer stage 41.

Subsequently, the plate transporter 22B is lowered to a position above the transfer stage 41 by a predetermined height so as not to interfere with the plate 5, and rotates counterclockwise by 90 degree. Then, the plate transporter 22B is lowered to the position of the transfer stage 41 to hold the plate 5. The plate transporter 22B subsequently rises by a predetermined height and rotates clockwise by 90 degree while holding the plate 5. Finally, the plate transporter 22B moves to the level of the slot storing the plate 5 and stores the plate 5. In the above-described example, the plate transporter 22B rises to the level of the slot on the tenth tier and moves forward in the Y axis direction. Then, the plate transporter 22B stores the plate 5 in the slot on the tenth tier.

(2-4) Other Operations

In the above-described operation example described in "(2-2) Supply of Plates to Autosampler," the case where the plate changer 2A receives the plate 5 from the plate changer 2B and transfers the plate 5 to the autosampler 1 is described as the example. In a case where the destination of the supply instruction received from the controller 11 of the autosampler 1 is the plate changer 2A, that is, in a case where the target plate 5 to be analyzed is stored in the rack 23A, the plate changer 2A takes out the plate 5 from the rack 23A and transfers the plate 5 to the autosampler 1. In other words, in the above-described example of the operation of "(2-2) Supply of Plates to Autosampler," the plate transporter 22A receives the plate 5 from the transfer stage 41 and transfers the plate 5 to the analysis plate stage 43 of the autosampler 1. In the case where the destination of the supply instruction is the plate changer 2A, the controller 21A performs control of specifying the target plate 5 included in the supply instruction, taking out the plate 5 from the rack 23A, and transporting the plate 5 to the analysis plate stage 43.

In the above-described operation example described in "(2-3) Collection of Plates from Autosampler," the case where the plate changer 2A receives the plate 5 from the autosampler 1 and transfers the plate 5 to the plate changer 2B is described as the example. In a case where the destination of the supply instruction received from the controller 11 of the autosampler 1 is the plate changer 2A, the plate changer 2A stores the plate 5 collected from the autosampler 1 in the rack 23A. In other words, in the above-described example of the operation of "(2-3) Collection of Plates from Autosampler," the plate transporter 22A receives the plate 5 from the analysis plate stage 43 of the autosampler 1 and transfers the plate 5 to the transfer stage 41. In a case where a return destination of the target plate 5 is the rack 23A of the plate changer 2A, the controller 21A performs control of collecting the plate 5 from the analysis plate stage 43 and storing the plate 5 in the original slot of the rack 23A.

(3) Other Connection Forms

In the above-described embodiment, the description is made on the case where the two plate changers 2A, 2B are connected at the side of the autosampler 1. The number of plate changers connected to the autosampler is not particularly limited. For example, a larger number of plate changers such as three, four, and so on may be connected.

Figure 13:
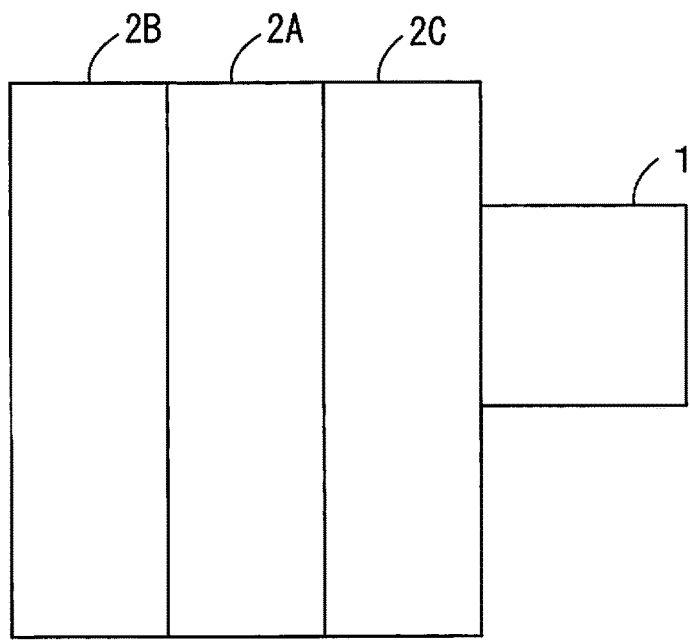
FIG. 13 is a diagram showing an aspect in which three plate changers are connected.

FIG. 13 is a diagram showing an embodiment in which three plate changers 2A, 2B, and 2C are connected. That is, the plate changer 2C is additionally provided between the plate changer 2A and the autosampler 1 in the embodiment shown in FIGS. 1, 2, etc. In this case, the plate 5 stored in the rack 23B of the plate changer 2B is transported in order from the plate changer 2B through the plate changer 2A and the plate changer 2C to the autosampler 1, and then placed on the analysis plate stage 43. When analysis processing is completed, the plate 5 is transported from the autosampler 1 through the plate changer 2C and the plate changer 2A to the plate changer 2B and then stored in the original slot in the rack 23B.

An operation in a case where a larger number of plate changers such as four, five, and so on are connected is similar. Each plate changer receives a target plate 5 to be analyzed from a plate changer at a preceding position and transfers the plate 5 to a plate changer at a succeeding position. A plate changer at a most-succeeding position (a plate changer closest to the autosampler 1) transfers the received plate to the autosampler 1. Also, each plate changer receives the analyzed plate 5 from the plate changer at the succeeding position and transfers the received plate 5 to the plate changer at the preceding position or stores the received plate 5 in the rack of the plate changer itself. Also in the case where three or more plate changers are connected, the autosampler 1 and the controllers of the plurality of plate changers are daisy-chain-connected similarly to the above-described embodiment.

In the above-described embodiment, the description is made on the case where the two plate changers 2A, 2B are connected at the side of the autosampler 1. That is, the different plate changer 2B is connected at the preceding position of the plate changer 2A. As another example, a preprocessor for a sample may be connected at the preceding position of the plate changer 2A.

Figure 14:
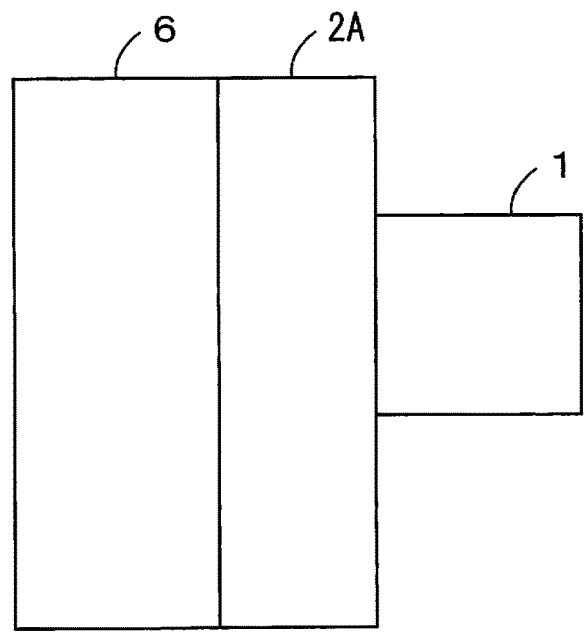
FIG. 14 is a diagram showing an aspect in which a preprocessor is connected at a preceding position of the plate changer.

FIG. 14 is a diagram showing an embodiment in which the plate changer 2A and a preprocessor 6 are connected. That is, the preprocessor 6 is additionally attached to the preceding position of the plate changer 2A in place of the plate changer 2B in the embodiment shown in FIGS. 1, 2, etc.

The preprocessor 6 performs processing such as processing of removing components contained in a sample that are unnecessary for analysis processing, processing of labeling a specific component, or processing of extracting the specific component. When the preprocessor 6 completes preprocessing to the sample, the preprocessor 6 places the plate storing the sample on the transfer stage similarly to the above-described plate changer 2B. That is, the preprocessor 6 places the plate 5, in which the preprocessed sample is stored, on the transfer stage. The plate changer 2A receives the plate 5 placed on the transfer stage and supplies the received plate 5 to the autosampler 1. The transfer stage is provided to bridge across in the casings of the preprocessor 6 and the plate changer 2A.

In this case, the plate 5 preprocessed in the preprocessor 6 is transported in order from the preprocessor 6 through the plate changer 2A to the autosampler 1 and then placed on the analysis plate stage 43.

The preprocessor 6 may be arranged at a most-preceding stage (a position farthest from the autosampler 1). For example, in a case where a large number of plate changers such as three, four, and so on are connected, the preprocessor 6 is connected at the preceding stage of the plate changer at the most-preceding stage. The plate 5 preprocessed in the preprocessor 6 is transferred in order among the plate changers and then supplied to the autosampler 1.

In the above-described embodiment, the description is made on the case where the plate changers 2A, 2B supply the plate storing the sample to the liquid chromatograph 10. The plate changers 2A, 2B of this embodiment can also be used in another apparatus such as a gas chromatograph other than the liquid chromatograph.

The specific configuration of the present invention is not limited to the above-described embodiments, and various variations and modifications may be made without departing the scope of the present invention.

(4) Correspondences Between Constituent Elements in Claims and Parts in Embodiments While examples of correspondences between constituent elements in claims below and parts in the embodiments are explained in the following paragraphs, the present invention is not limited to the examples below. In the above-described embodiments, the liquid chromatograph 10 is an example of an analyzer. Also, in the above-described embodiments, the plate changer 2A is an example of a plate changer in the claims, and the plate changer 2B is an example of a first plate changer. Further, in the above-described embodiments, the plate changer 2C is an example of a second plate changer. Moreover, in the above-described embodiments, the rack 23A is an example of a storage.

As each of various elements recited in the claims, various other elements having configurations or functions described in the claims can be also used.

(5) Aspects

The above-mentioned plurality of exemplary embodiments are understood as specific examples of the below-mentioned aspects by those skilled in the art.

(Item 1) A plate changer according to one aspect is a plate changer that supplies a plate storing a sample to an autosampler included in an analyzer and includes:
- a storage that stores the plate; and
- a plate transporter that transports the plate by holding the plate, and
- the plate transporter receives the plate from a first plate changer provided at one side of the plate changer and also transfers the plate received from the first plate changer to a second plate changer or the autosampler provided at another side of the plate changer or transfers the plate stored in the storage to the second plate changer or the autosampler.

The plate changer of this embodiment can supply the plate to the autosampler by transferring the plate among the plate changers. This makes it possible to flexibly deal with the number of plates that can be supplied to the autosampler according to a user's needs.

(Item 2) In the plate changer according to item 1,
the plate transporter may receive the plate from the second plate changer or the autosampler and also transfer the plate received from the second plate changer or the autosampler to the first plate changer or store the plate received from the second plate changer or the autosampler into the storage.

The plate changer of this embodiment can collect the plate from the autosampler by transferring the plate among the plate changers. This makes it possible to flexibly deal with the number of plates that can be supplied to the autosampler according to the user's needs.

(Item 3) In the plate changer according to item 1,
the plate transporter may receive the plate from a preprocessor for a sample provided at one side of the plate changer and also transfer the plate received from the preprocessor to the second plate changer or the autosampler.

The plate changer of this embodiment can supply the plate to the autosampler by transferring the plate among the preprocessor and the plate changers.

(Item 4) In the plate changer according to item 1,
when the plate is transported from the first plate changer to a transfer place where the plate is transferred to the plate transporter, the plate transporter may retract in a top-and-bottom direction in the plate changer so as not to interfere with a transport operation of transporting the plate to the transfer place.

It is possible to make smaller a space required for a transfer operation of transferring the plate.

(Item 5) In the plate changer according to item 4,
the plate may be placed on a transfer stage provided at the transfer place by the transport operation, and the plate transporter may hold the plate placed on the transfer stage.

The transfer of the plate among the plate changers is carried out through the transfer stage. The number of plate changers can be easily increased.

(Item 6) In the plate changer according to item 5,
the transfer stage may be provided to bridge across in a casing of the plate changer and in a casing of the first plate changer.

The transfer operation of transferring the plate is easily performed among the plate changers.

(Item 7) In the plate changer according to claim 1,
a communication line among the first plate changer, the plate changer, and the second plate changer or a communication line among the first plate changer, the plate changer, and the autosampler may be daisy-chain-connected.

Wiring of the communication lines connecting the plate changers is simplified. Complication of wiring around the analyzer can be avoided.

The invention claimed is:

1. A plate changer that supplies an analysis plate, of a plurality of analysis plates, storing a sample, to an autosampler included in an analyzer, comprising:
a storage where the plurality of analysis plates are stored;
a transfer stage being at a position different from a position of the storage;
a plate transporter having an arm movable in at least two directions that transports the plate by holding the plate using the arm,
wherein the plate changer is one of a plurality of plate changers arranged adjacently on one side of the autosampler to supply plates to the autosampler; and
a controller configured to control movement of the arm in the at least two directions, such that the plate transporter interacts with another plate changer of the plurality of plate changers to supply the analysis plate to the autosampler;
wherein the controller is configured to control the plate transporter to:
receive the analysis plate placed on the transfer stage by a first plate changer of the plurality of plate changers provided at one side of the plate changer and also transfer the analysis plate received from the first plate changer to a second plate changer of the plurality of plate changers at another side of the plate changer, wherein the transferred plate is separate from the stored plurality of plates;
receive the analysis plate placed on the transfer stage by the first plate changer provided at the one side of the plate changer and also transfer the analysis plate received from the first plate changer to the autosampler provided at the another side of the plate changer, wherein the transferred plate is separate from the stored plurality of plates; or
transfer as the analysis plate one of the plurality of stored plates via the plate transporter to the second plate changer at the another side of the plate changer.

2. The plate changer according to claim 1, wherein the controller is further configured to control the plate transporter to:
receive the analysis plate from the second plate changer or the autosampler; and
transfer the analysis plate received from the second plate changer or the autosampler to the first plate changer or store the plate received from the second plate changer or the autosampler into the storage.

3. The plate changer according to claim 1, wherein the controller is further configured to control the plate transporter to:
receive the analysis plate from a preprocessor for a sample provided at one side of the plate changer; and transfer the analysis plate received from the preprocessor to the second plate changer or the autosampler.

4. The plate changer according to claim 1, wherein the controller is further configured to control the plate transporter to:
when the plate is transported from the first plate changer to the transfer stage where the plate is transferred to the plate transporter, the plate transporter retracts in a top-and-bottom direction in the plate changer so as to not interfere with a transport operation of transporting the plate to the transfer place.

5. The plate changer according to claim 1, wherein the transfer stage bridges across the plate changer and the first plate changer of the plurality of plate changers.

6. The plate changer according to claim 1, wherein a communication line daisy chain connects:
a controller of the first plate changer, the controller of the plate changer, and a controller of the second plate changer; or
the controller of the first plate changer, the controller of the plate changer, and the controller of the autosampler.

7. An analyzer comprising:
an autosampler; and
a plurality of plate changers that supply an analysis plate, of a plurality of analysis plates, storing a sample to the autosampler, wherein the plurality of plate changers are arranged adjacently on one side of the autosampler to supply plates to the autosampler,
each of the plurality of plate changers including
a plate transporter having an arm movable in at least two directions that transports the plates by holding the plate using the arm,
a storage where the plurality of analysis plates are stored,
a transfer stage being at a position different from a position of the storage, and
a controller configured to:
control movement of the arm in the at least two directions, such that the plate transporter interacts with another plate changer of the plurality of plate changers to supply the analysis plate to the autosampler,
control the plate transporter to:
receive the analysis plate placed on the transfer stage by a first plate changer of the plurality of plate changers provided at one side of the plate changer and also transfer the analysis plate received from the first plate changer to a second plate changer of the plurality of plate changers at another side of the plate changer, wherein the transferred plate is separate from the stored plurality of plates;
receive the analysis plate placed on the transfer stage by the first plate changer provided at the one side of the plate changer and also transfer the analysis plate received from the first plate changer to the autosampler provided at the another side of the plate changer, wherein the transferred plate is separate from the stored plurality of plates; or
transfer as the analysis plate one of the plurality of stored plates via the plate transporter to the second plate changer at the another side of the plate changer.

* * * * *